N-NARY COUNTER

Filed Aug. 21, 1967

INVENTORS
ISAMU WASHIZUKA
HITOSHI HANAHARA
KUNIO YOSHIDA
Fleit, Hohbach, Test, Albritton & Herbert
ATTORNEYS INVENTORS
ISAMU WASHIZUKA
HITOSHI HANAHARA
KUNIO YOSHIDA
BY
Fleit, Hochbach, Gipple, Albritton & Herbert
ATTORNEYS INVENTORS
ISAMU WASHIZUKA
HITOSHI HANAHARA
KUNIO YOSHIDA
BY Fleit, Hohbach, Test, Albritton & Herbert
ATTORNEYS INVENTORS
ISAMU WASHIZUKA
HITOSHI HANAHARA
KUNIO YOSHIDA
BY
Fleit, Hohbach, Test, Albritton & Herbert
ATTORNEYS 3,513,329
Patented May 19, 1970

3,513,329

N-NARY COUNTER

Isamu Washizuka, Osaka, and Hitoshi Hanahara and Kunio Yoshida, Nara-ken, Japan, assignors to Hayakawa Denki Kogyo Kabushiki Kaisha, Osaka, Japan, a corporation of Japan Filed Aug. 21, 1967, Ser. No. 661,952
Claims priority, application Japan, Sept. 1, 1966, 41/58,018
Int. Cl. H03k *21/00, 23/08*
U.S. Cl. 307—223 8 Claims

ABSTRACT OF THE DISCLOSURE

An N-nary counter comprising *n* delay memory elements connected in series so that the input terminal and the output terminal of any memory element is connected to the output side of the preceding element and to the input side of the succeeding element for shifting the state successively to succeeding elements including a logic state to which the states of any two or more memory elements are applied as inputs and which is connected to the input side of the memory element in the first stage only.

BACKGROUND OF THE INVENTION

The invention relates, in general, to an N-nary counter comprising a plurality of memory elements, and more particularly to a counter adapted to employ integrated or microcircuits.

Substantial research has been conducted to provide integrated or microcircuits for the electronics industries. As is known, in such circuits a number of individual components or devices are formed in a single semiconductive crystal to form a circuit. The field of electronic computer engineering is presently in the process of adapting such circuits to computers to miniaturize and improve their operation. One such circuit is the N-nary counter employed as the timing counter and the address counter of electronic computers.

Generally, the use of *m* flip-flop circuits is needed in setting up an N-nary counter (where $n \leqq 2^m$). For example, a decimal counter requires four flip-flop circuits. In the decimal counter, every input pulse gives rise to corresponding consecutive count up of the state of four bits in the circuit, such as, 0001→0010→0011→0100 . . . is realized at every application of pulse input.

A decoding circuit is required to obtain a decimal output from the counter circuit. One such circuit is composed of ten AND gate circuits of the four-input terminal type. It is impractical to adapt such counters to integrated circuit technology. To incorporate such a decoding circuit into the equivalent integrated circuit according to conventional techniques would involve a number of difficulties because of the large number of logical gate circuits.

Commercially available packages for an integrated circuit are limited in the number of terminals which are available. Therefore, actually only two AND gates can be combined in one semiconductor block or wafer. This, in turn, means a useless increase of the number of needed blocks or wafers to form the desired computer circuit.

The conventional alternative, a counter of ring-type, has a difficulty in that it must incorporate a conventional flip-flop circuit in order to equalize the initial state of the register element in all of the stages.

On the other hand, an N-nary counter comprising N flip-flop circuits has an advantage in that it needs no decoder for obtaining the necessary decimal output. Its disadvantage is that the control of input-output between individual stages is rendered complicated because of the large number of logical gate circuits needed. Thus, the conventional ring counter is unacceptable for integrated or microcircuit applications.

The need for the logical gate circuits in the ring counter is for introduction of both setting and resetting input pulses into the counter as well as for resetting of the flip-flop circuits whenever a preceding flip-flop circuit has been brought to its reset stage.

Beside the above mentioned needs, there must be incorporated a properly designed complex circuit to equalize the initial state of all the individual flip-flop circuits and more specifically a circuit capable of automatically restoring an erroneous state, if any, caused for some reason to the correct state with a high degree of reliability and accuracy.

It is a general object of the present invention to overcome the aforemention difficulties by minimizing, as far as possible, the number of the logic gate circuits needed in an N-nary counter so that the circuit is acceptable for manufacture by integrated or microcircuit techniques.

It is another object of the present invention to provide an N-nary counter in which the initial state is unimportant and which is capable of performing an automatic correction of any erroneous state.

Another object of the present invention is to provide an N-nary counter in which the state of one stage is easily carried over to adjacent stages and which does not require bringing the memory elements to the reset stage whenever a preceding memory element has been reset.

SUMMARY OF THE INVENTION

Briefly, the invention is directed to an N-nary counter comprising *n* delay memory elements (flip-flops) in a series of which the output signal taken out of a flip-flop is carried to the next adjacent flip-flop in the following stage, said carryover being, in turn, repeated to the last stage, and finally the state of the output of two or more stages is fed back to the memory element in the first stage through a single logical gate circuit.

Other objects and a fuller understanding of the invention may be had by referring to the following description, disclosure and claims, taken in conjunction with the accompanying drawings in which:

Figure 1:
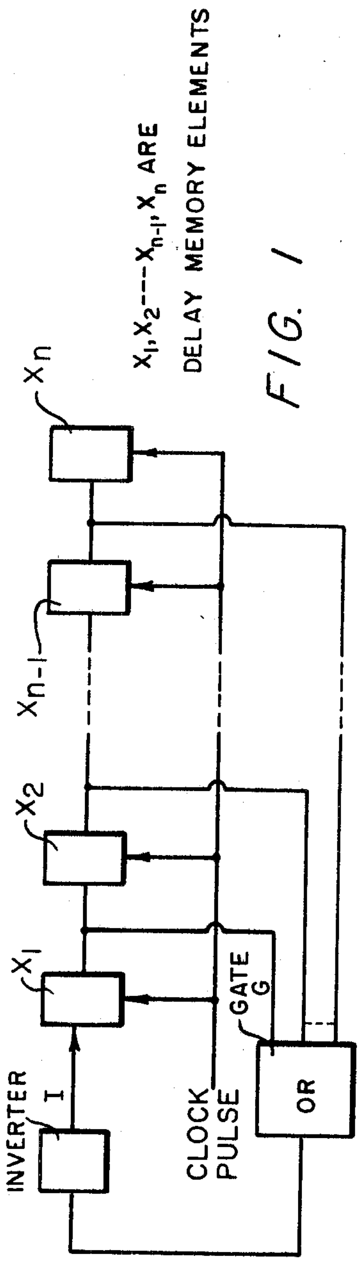
FIG. 1 is a block diagram representing one embodiment of the invention.

In the embodiment of the invention shown in FIG. 1, $X_1$, $X_2$, . . . $X_{n-1}$, $X_n$ are individual delay memory elements (specifically, delay flip-flop circuits). The output signal of an element is fed to the next element in the series. The input terminal of one element in one stage is connected to the output of the preceding stage, while the output terminal of said element is connected to the input side of the next stage. Thus, successive transfer of the state of a memory element is repeated up to the last stage. A common clock pulse is applied to all the memory elements for controlling their operation. G represents an ($n$—1 input) OR gate circuit which rceives inputs from from all memory elements except the last stage. The output of the OR gate G is fed back to the memory element in the first stage. I is an inverter having a characteristic NOT function and serving to cause a feedback of the output of the gate circuit G to the memory element in the first stage.

In this full circuit diagram, the information of "1" in the memory element in the first stage $X_1$ is transferred successively to the subsequent elements until the last stage $X_n$ is reached in synchronism with the clock pulse. The changes in the memory elements in a series of stages are as listed below. This in itself is not new and corresponds to that of the conventionally known ring counter.

CHANGE OF STATE

| Time | $X_1$ | $X_2$ | $X_3$ | $X_4$ . . . . | $X_{n-1}$ | $X_n$ |
|---|---|---|---|---|---|---|
| $t_0$ | 1 | 0 | 0 | 0 | 0 | 0 |
| $t_1$ | 0 | 1 | 0 | 0 | 0 | 0 |
| $t_2$ | 0 | 0 | 1 | 0 | 0 | 0 |
| $t_3$ | 0 | 0 | 0 | 1 | 0 | 0 |
| . | | | | | | |
| . | | | | | | |
| . | | | | | | |
| $t_{n-2}$ | 0 | 0 | 0 | 0 | 1 | 0 |
| $t_{n-1}$ | 0 | 0 | 0 | 0 | 0 | 1 |

The example described above is an embodiment of the invention where at a time $t$, only one of the memory elements is allowed to be in state of "1" and all others are in stage of "0." The following equation is applicable for individual memory elements:

$$X_1{}^{t+1} = (\overline{X_1 + X_2 + \ldots X_{n-1}})^t$$
$$X_2{}^{t+1} = X_1{}^t$$
$$X_3{}^{t+1} = X_2{}^t$$
$$\vdots$$
$$X_n{}^{t+1} = X_{n-1}{}^t$$

in which $t$, $t+1$ represents time.

As can be seen from above, it is sufficient in making a counter to place the logical gate circuit in the memory element of the first stage only. The remainder of the memory elements perform the function of shifting or transferring only. It is to be noted that this embodiment of the invention has no concern for the state of the output from the memory element in the last stage in establishing the application equation described above because the invention involves the use of delay type memory elements.

Figure 2:
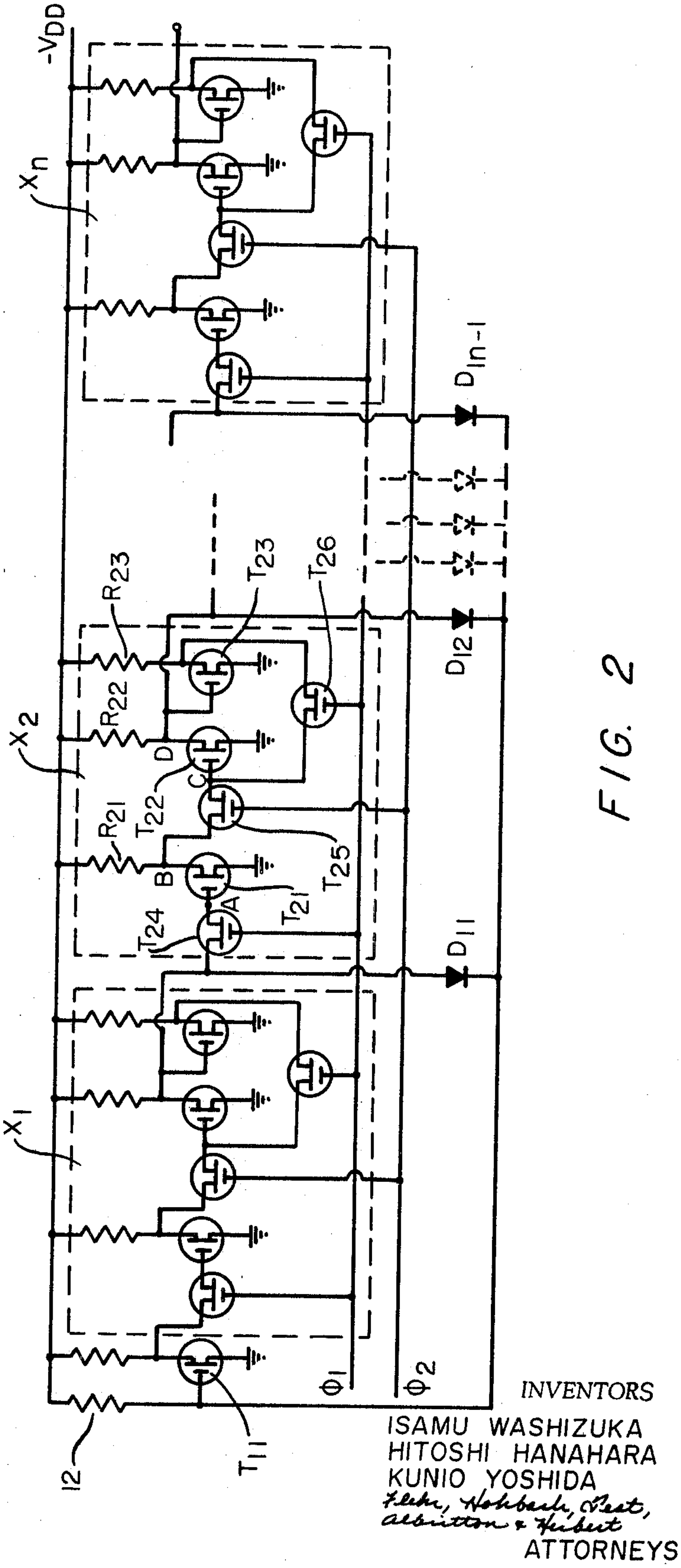
FIG. 2 is a circuit diagram of the embodiment shown in FIG. 1.

The foregoing example of the invention can employ as the transfer elements the extra-small integrated circuit, including the field effect transistor, type MOS, characterized by P channel enhancement. FIG. 2 is an N-nary counter employing field effect transistors of this type. The sections enclosed by the dash line are the delay flip-flop circuits, each having the same diagrammatic construction. The flip-flop $X_2$ in the second stage is chosen for explanation. The transistors $T_{21}$, $T_{22}$ and $T_{23}$ operate as a memory element functioning according to the storage of the internal capacity of their gate electrodes, while the other transistors $T_{24}$, $T_{25}$ and $T_{26}$ serve as a switching means operating either to open or to close electronically, depending on whether the clock pulses $\phi_1$ and $\phi_2$ are present or not. The gate electrodes of the transistors $T_{21}$, $T_{22}$ and $T_{23}$ are connected to the output terminal of the preceding stage, while the source electrodes are grounded. The drain electrodes are connected to the source $-V_{DD}$ through the load resistance $R_{21}$, $R_{22}$ and $R_{23}$. The gate electrodes of the switching transistors $T_{24}$, $T_{25}$ and $T_{26}$ are connected to the terminal for introduction of the clock pulses $\phi_1$ and $\phi_2$, while their source and drain electrodes are placed in the information path.

Operation of the circuit shown and described above is as follows:

For better understanding of the description which follows, the potential of the information signals is 0 volt and $-V_{DD}$ volt for the binary digits "1" and "0," respectively.

The input information is applied to the source electrodes of the transistor $T_{24}$. The clock pulse is applied to the switching transistors at the time of $t_1$ and the transistor $T_{24}$ becomes conductive (ON), synchronized with said pulse, resulting in application of the potential representing the input information to the gate electrode (at point A) of the transistor $T_{21}$, with no voltage drop. The input information is then at the potential of 0 volt so that the state of the transistor $T_{21}$ is changed to be non-conductive (OFF), resulting in no accumulation whatsoever of charge by the internal capacity of the gate electrode. Under such condition, the transistor $T_{21}$ itself is resistive and the drain potential (at point B) is approximately $-V_{DD}$ volt.

At the time $t_2$, with the clock pulse $\phi_2$ applied to the gate electrode of the transistor $T_{25}$, it becomes conductive to cause the circuit to be completed to its output, and subsequently, the state of drain potential of the transistor $T_{21}$ is allowed to be carried over to the gate electrode (at point C) of the transistor in the subsequent stage. The drain potential of the transistor $T_{21}$ is $-V_{DD}$ volt so that the transistor $T_{22}$ is changed to be inconductive state and resultantly the charge is accumulated by the internal capacity of the gate electrode until the gate potential becomes $-V_{DD}$ volt. Even after having been rendered electronically opened by the transistor $T_{25}$, the information is stored by the internal capacity of the gate electrode of said transistor for memory. Under such condition of the transistor $T_{25}$, the drain potential (at point D) becomes 0 volt if the internal resistance of the transistor $T_{22}$ is neglected. This corresponds to the state "1" of the binary digit and means that the state of the drain potential corresponds to the input information occurring with a delay of time equivalent to one cycle (1 bit time) of the clock pulse.

Figure 3:
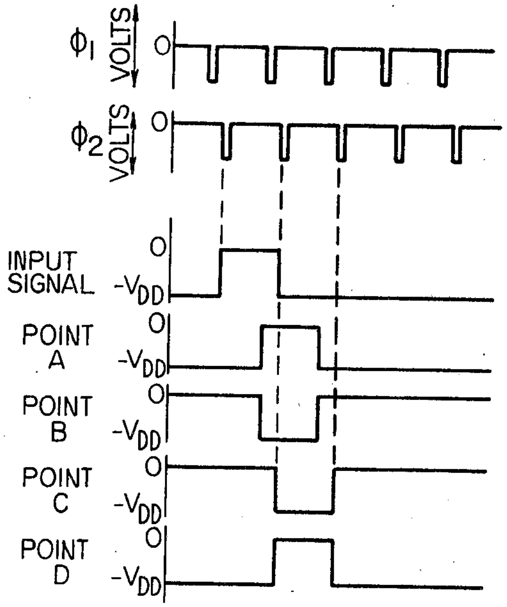
FIG. 3 shows the waveform of voltage at various points in the circuit illustrated in FIG. 2.

The clock pulses $\phi_1$ and $\phi_2$ are periodically applied as illustrated in FIG. 3. This results in the consecutive operation of the memory elements depending on the time. A counting action results in response to the input applied from outside.

Further, in conjunction with the above described example of the embodiment of the invention, due to the characteristic limit imposed on the time for effective storage by the internal capacity of the gate electrode inherent to a MOS type field effect transistor, an information circulation loop is established by connection of the transistor $T_{23}$ to the input side of the transistor $T_{22}$ by a transistor $T_{26}$. The transistor $T_{26}$ is controlled by the clock pulse $\phi_1$ to permit feedback of information. diodes $D_{11}$, $D_{12}$ . . . $D_{1n-1}$, connected to the output of each of the elements X except $X_n$, form the OR gate circuit. Voltage is applied at the point of diode connection through a suitable resistance.

Said OR gate circuit provides a gating function in a manner as described below. When the counter is operated to perform normal counting, the diode $D_{1i}$ ($1 \leqq i \leqq n-1$) connected to a flip-flop circuit in the "1" state of the binary digit becomes conductive (ON). The OR gate output is, therefore, the state "1." The inverting transistor $T_{11}$ placed between the logical gate circuit and the flip-flop circuit in the first stage is turned into cut-off state, and accordingly exerts no effect whatsoever on the flip-flop circuit in the first stage. On the other hand, when all flip-flop circuits other than that in the last stage are in "0" state thereof, all the diode $D_{11}$, $D_{12}$ . . . $D_{1n-1}$ become non-conductive, giving rise to a drop of the gate potential of the transistor $T_{11}$ down to $-V_{DD}$ volt which, in its turn, causes the transistor $T_{11}$ to become conductive and the drain potential to rise up to 0 volt. In this way, the information "1" is put into the flip-flop circuit in the first stage to initiate the ring counting action of the counter which is repeated by subsequent inputs of the signal of information to continue counting up or down as the case may be.

The circuit described offers a number of significant advantages. In any N-nary counter of conventional design, composed of binary memory elements and decoders, a change in the number *n* may result in an appreciable change of the input conditions of the logic gate circuit, require additional memory elements and necessitate changes in the decoder matrix. With the present invention, a counter circuit of any capacity can be formed by employing a shift register having a capacity of *n* bits in combination with a single logic gate.

In the manufacture of an N-nary counter utilizing *m* binary flip-flop circuits pursuant to the prior art methods, the number of integrated circuit elements needed to make the decoding circuit is relatively large since it, in general, will include a large number of logic gate circuits. Generally, in integrated circuits only about two AND gate circuits may be fabricated in a single block of semiconductor material while, on the other hand, about four flip-flop circuits may be placed therein with relative ease. For this reason, the present invention which comprises *n* memory elements requires no increase in the number of integrated circuits.

Thirdly, the invention does not require control of the state in the individual stages or elements. In accordance with the invention, bringing one memory element to an operative state causes the output from the preceding memory element to revert to the input signal one bit time earlier and, accordingly, there is no need for resetting the memory element.

Fourth, pursuant to the invention, the operative state is defined by the application equation $$X_1^{t+1}=(X_1+X_2+\ \ldots\ X_{n-1})$$

so that the operative state is not affected by the initial state, with the result that the inside of the memory element can always be kept correct. Erroneous states, if any, taking place during the counting, are likewise corrected automatically as can be seen from the following table.

CHANGE OF STATE

| Time | $X_1$ | $X_2$ | $X_3$ | $X_4$ | $X_5$ | |
|---|---|---|---|---|---|---|
| $t_0$ | 1 | 0 | 1 | 1 | 0 | . . . Erroneous state. |
| $t_1$ | 0 | 1 | 0 | 1 | 1 | |
| $t_2$ | 0 | 0 | 1 | 0 | 1 | |
| $t_3$ | 0 | 0 | 0 | 1 | 0 | . . . State after correction. |
| $t_4$ | 0 | 0 | 0 | 0 | 1 | |
| $t_5$ | 1 | 0 | 0 | 0 | 0 | |

Fifth, there is no need for use of the decoder at all because only one of *n* memory elements is in state of "1," while all remainders are in state of "0." This advantage, in turn, contributes greatly to the minimization of the difficulty of crossover of the congested information lines on the printed circuit base, besides the reduction of total space required for installation of said elements on the printed circuit base. It is to be noted that this type of advantage is true not only in case of the example of embodiment of the invention hereinabove described, but also, no doubt, in other cases of the embodiments as will be disclosed hereinbelow.

A second embodiment of the invention is where the operating principle is the same as that just described but the state "0" is utilized. In this example, only one of *n* flip-flop circuits is in the state of "0," all remainders being in the state of "1," as illustrated in the following chart of output states covering all the flip-flop circuits.

| Time | $X_1$ | $X_2$ | $X_3$ | $X_4 \ldots X_{n-1}$ | | $X_{-n}$ |
|---|---|---|---|---|---|---|
| $t_0$ | 0 | 1 | 1 | 1 | 1 | 1 |
| $t_1$ | 1 | 0 | 1 | 1 | 1 | 1 |
| $t_2$ | 1 | 1 | 0 | 1 | 1 | 1 |
| $t_3$ | 1 | 1 | 1 | 0 | 1 | 1 |
| ⋮ | | | | | | |
| $t_{n-2}$ | 1 | 1 | 1 | 1 | 0 | 1 |
| $t_{n-1}$ | 1 | 1 | 1 | 1 | 1 | 0 |

The application equation for any stage of flip-flop circuit can be given by:

$$X_1^{t+1}=\overline{(X_1 \cdot X_2 \cdot\ \ldots\ \cdot X_{n-1})}^{\,t}$$
$$X_2^{t+1}=X_1^t$$
$$\vdots$$
$$X_n^{t+1}=X_{n-1}^t$$

Figure 4:
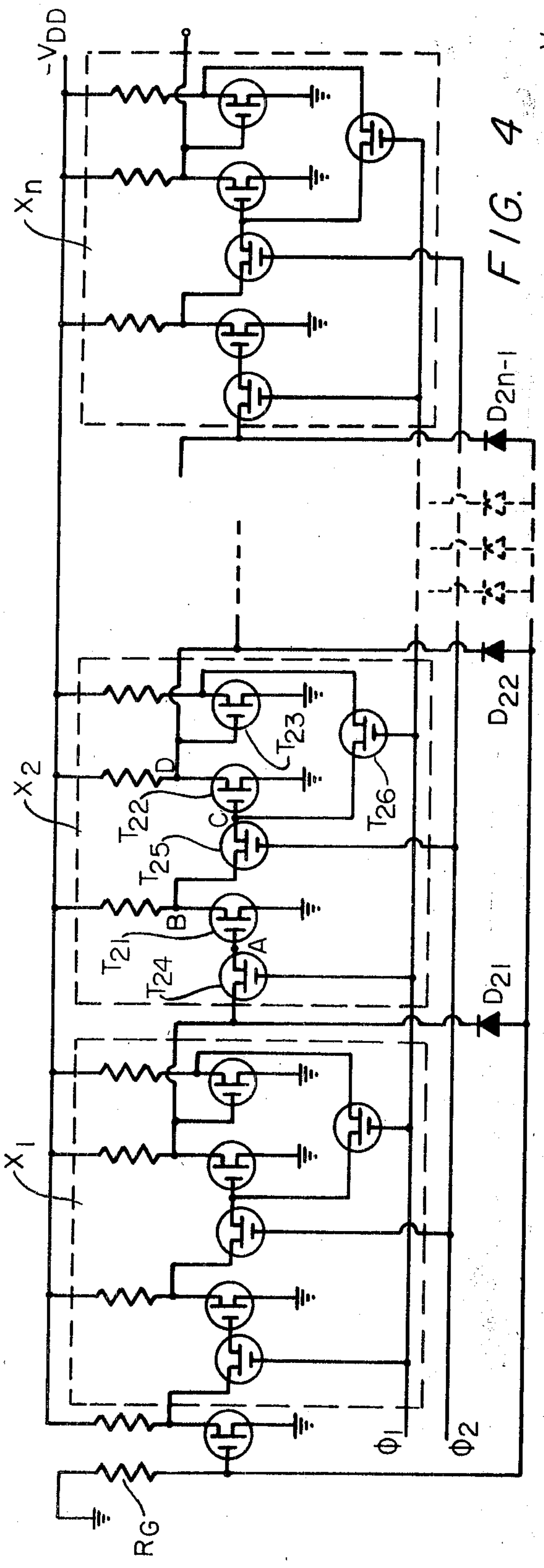
FIG. 4 is a circuit diagram representing another embodiment of the invention.

This embodiment is shown in FIG. 4 which is a circuit embodying field effect transistors, as in the preceding example.

In this example, only the logic gate circuits differ. The flip-flop circuits are the same as previously described. The logic circuit is different in that diodes $D_{21}$, $D_{22}$, . . . $D_{2n-1}$ have their polarity reversed and the connecting point of these diodes is connected to ground through the resistance $R_G$.

Gating in this circuit is performed according to the following principle:

When normal counting is being performed, one of the flip-flop circuits delivers the output voltage of $-V_{DD}$. Only the diode $D_{21}$ ($1 \leqq i \leqq n-1$) which is connected to that flip-flop circuit is conductive. The logic gate output is in the state of "0" ($-V_{DD}$ volt). The negative potential output of said flip-flop circuit is applied to the inverting transistor $T_{11}$ which then becomes conductive. Therefore, the drain potential of the transistor $T_{11}$ is 0 volt, thus exerting no effect whatsoever to the flip-flop circuit in the first stage. When all the flip-flop circuits except that in the last stage are in the state of "1," all of the diodes $D_{21}$, $D_{22}$ . . . $D_{2n-1}$ are non-conductive, resulting in the absence of negative potential applied to the gate electrode of the transistor $T_{11}$. This, in turn, renders the transistor in its non-conductive state. Under such conditions, the drain potential of the transistor $T_{11}$ is $-V_{DD}$ volt, causing the application of information "0" to the flip-flop circuit in the first stage to thereafter shift or transfer the "0" during the counting operation.

A third embodiment of the invention may be an N-nary counter having a simpler logic gate circuit. This can be realized by bringing all *n* flip-flop circuits into the state "1" simultaneously exactly when the source voltage has been applied. The example of the change of states in individual stages and the truth value for this embodiment are listed below:

CHANGE OF STATE

| Time | $X_1$ | $X_2$ | $X_3$ | $X_4 \ldots$ | $X_{n-1}$ | $X_n$ | |
|---|---|---|---|---|---|---|---|
| $t_0$ | 1 | 1 | 1 | 1 | 1 | 1 | |
| $t_1$ | 0 | 1 | 1 | 1 | 1 | 1 | |
| $t_2$ | 0 | 0 | 1 | 1 | 1 | 1 | |
| $t_3$ | 0 | 0 | 0 | 1 | 1 | 1 | |
| ⋮ | | | | | | | |
| $t_{n-1}$ | 0 | 0 | 0 | 0 | 0 | 1 | Repeated subsequently. |
| $t_n$ | 1 | 0 | 0 | 0 | 0 | 0 | |
| $t_{n+1}$ | 0 | 1 | 0 | 0 | 0 | 0 | |
| $t_{n+2}$ | 0 | 0 | 1 | 0 | 0 | 0 | |
| $t_{n+3}$ | 0 | 0 | 0 | 1 | 0 | 0 | |

TRUTH TABLE

| Time t | | Time (t+1) |
|---|---|---|
| $X_{n-1}$ | $X_n$ | $X_1$ |
| 1 | 1 | 0 |
| 1 | 0 | 0 |
| 0 | 1 | 1 |
| 0 | 0 | 0 |

The equations applicable to the individual flip-flop circuits may be expressed as follows from the above example of change of state and listed truth values.

$$X_1^{t+1}=(\overline{X_{n-1}}\cdot X_n)^t$$
$$X_2^{t+1}=X_1^t$$
$$\vdots$$
$$X_n^{t+1}=X_{n-1}^t$$

Figure 5:
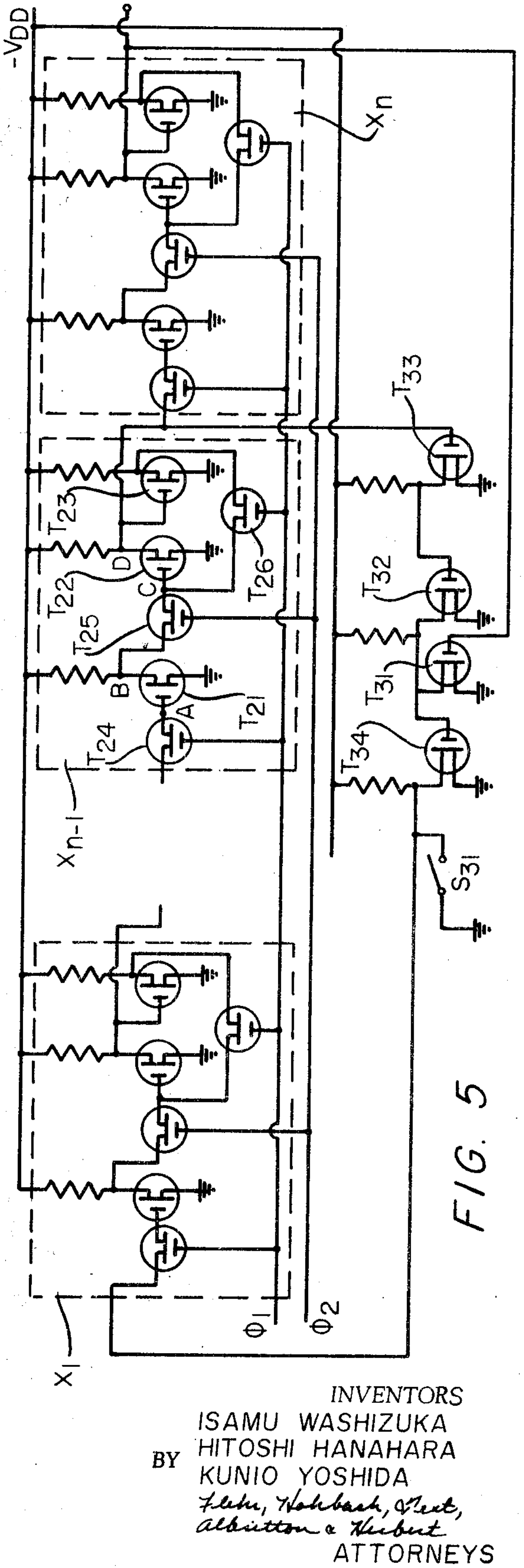
FIG. 5 is a circuit diagram representing a third embodiment of the invention.

The embodiment of the invention is shown in FIG. 5. This differs from the preceding examples only in the type of logic gate circuit and the switch which determines the initial state of individual stages. Namely, the logic gate circuit comprises four transistors, $T_{31}$–$T_{34}$. The gate electrode, source electrode and drain electrode of the transistor $T_{31}$ are connected to the output side of the flip-flop circuit in the last stage, ground and the $-V_{DD}$ source, respectively. Similarly, the transistor $T_{32}$ serves as a diode and has the gate electrode connected to the flip-flop circuit in the $(n-1)$th stage through the transistor $T_{33}$. Both transistors $T_{31}$ and $T_{32}$ jointly set up an AND input gate. The transistor $T_{33}$ offers an action "NOT" and has the gate electrode connected direct to the drain electrode of the transistor $T_{22}$. The transistor $T_{34}$ is an element to provide an outlet for output delivery of the gate circuit and has the gate electrode which is in direct connection to the drain electrodes of the transistors $T_{31}$ and $T_{32}$.

In this type of circuit connection, when the output (the drain potential of transistor $T_{22}$) of the flip-flop circuit in the $(n-1)$th stage is 0 volt, while that of the flip-flop circuit in the $n$th stage is $-V_{DD}$ volt, the transistors $T_{31}$ and $T_{32}$ are conductive and the gate potential of the transistor $T_{34}$ is raised up to 0 volt so that the transistor $T_{34}$ on the output side of the logic gate is rendered non-conductive. This means that only the information "0" is applied to the flip-flop circuit in the first stage and no order for counting is given through the transistor $T_{34}$. But, in case where the flip-flop circuits in the last two stages are in the state reverse to the preceding flip-flop circuit, both transistors $T_{31}$ and $T_{32}$ are non-conductive, so that the information "1" is allowed to be brought back to the flip-flop circuit in the first stage.

The switch $S_{31}$ determines the initial state. It has one of its terminals connected to the transistor $T_{34}$ and to the flip-flop circuit in the first stage and its other terminal grounded. This means that transistor $T_{34}$ permits the information "1" to be applied to the flip-flop circuit in the first stage through the switch $S_{31}$ throughout the period when said switch is kept closed (at least $n$-bit time) in order to keep said circuit at the state of "1" at the period.

Besides all the above mentioned examples, the fourth of the probable examples embodying the invention may be had, which provides an N-nary counter comprising the logic gate of a type made simpler than that in the second example by establishing the initial state for bringing all of $n$ flip-flop circuits to their state "0." Examples of the change of state in the individual stages of the counter operating with the initial state properly established for the flip-flop circuits in the individual stages and the truth table therefor are as follows:

CHANGE OF STATE

| Time | $X_1$ | $X_2$ | $X_3$ | $X_4$ . . . | $X_{n-1}$ | $X_n$ |
|---|---|---|---|---|---|---|
| $t_0$ | 0 | 0 | 0 | 0 | 0 | 0 |
| $t_1$ | 1 | 0 | 0 | 0 | 0 | 0 |
| $t_2$ | 1 | 1 | 0 | 0 | 0 | 0 |
| $t_3$ | 1 | 1 | 1 | 0 | 0 | 0 |
| ⋮ | | | | | | |
| $t_{n-1}$ | 1 | 1 | 1 | 1 | 1 | 0 |
| $t_n$ | 0 | 1 | 1 | 1 | 1 | 1 |
| $t_{n+1}$ | 1 | 0 | 1 | 1 | 1 | 1 |
| $t_{n+2}$ | 1 | 1 | 0 | 1 | 1 | 1 |
| $t_{n+3}$ | 1 | 1 | 1 | 0 | 1 | 1 |

TRUTH TABLE

| Time t | | Time (t+1) |
|---|---|---|
| $X_{n-1}$ | $X_n$ | $X_1$ |
| 1 | 1 | 1 |
| 1 | 0 | 0 |
| 0 | 1 | 1 |
| 0 | 0 | 1 |

From the above change of state and the truth table, the application equation for all the flip-flop circuits may be described as given in the following:

$$X_1^{t+1}=(\overline{X_{n-1}}+X_n)^t$$
$$X_2^{t+1}=X_1^t$$
$$\vdots$$
$$X_n^{t+1}=X_{n-1}^t$$

Figure 6:
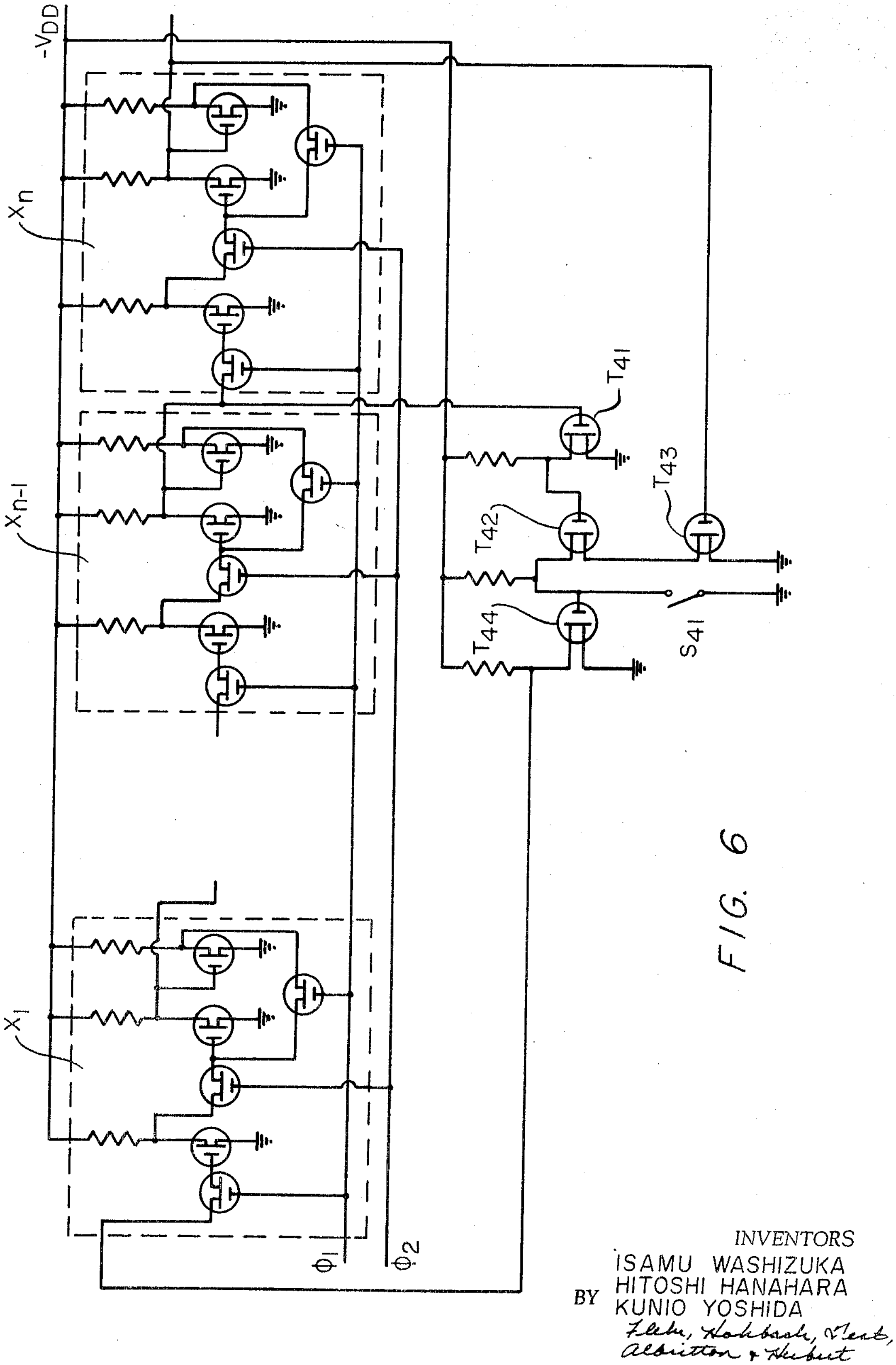
FIG. 6 is a circuit diagram representing a fourth embodiment of the invention.

Being explained more specifically in conjunction with FIG. 6, the above mentioned example of the invention may be described as follows. In this example, the embodiment differs from the preceding example only in that the logic gate and the switch defining the initial state are somewhat dissimilar. They comprise one transistor $T_{41}$ for "NOT" action and three other transistors $T_{42}$, $T_{43}$ and $T_{44}$ to set up the OR logic gate. The switch $S_{41}$ designed for determining the initial state is to apply the information of state "0" to the flip-flop circuit in the first stage. Full description of the function offered by this example embodying the invention is omitted herein because it is so simple that it can, without full description thereof, be readily understood from the above disclosure only.

Figure 7:
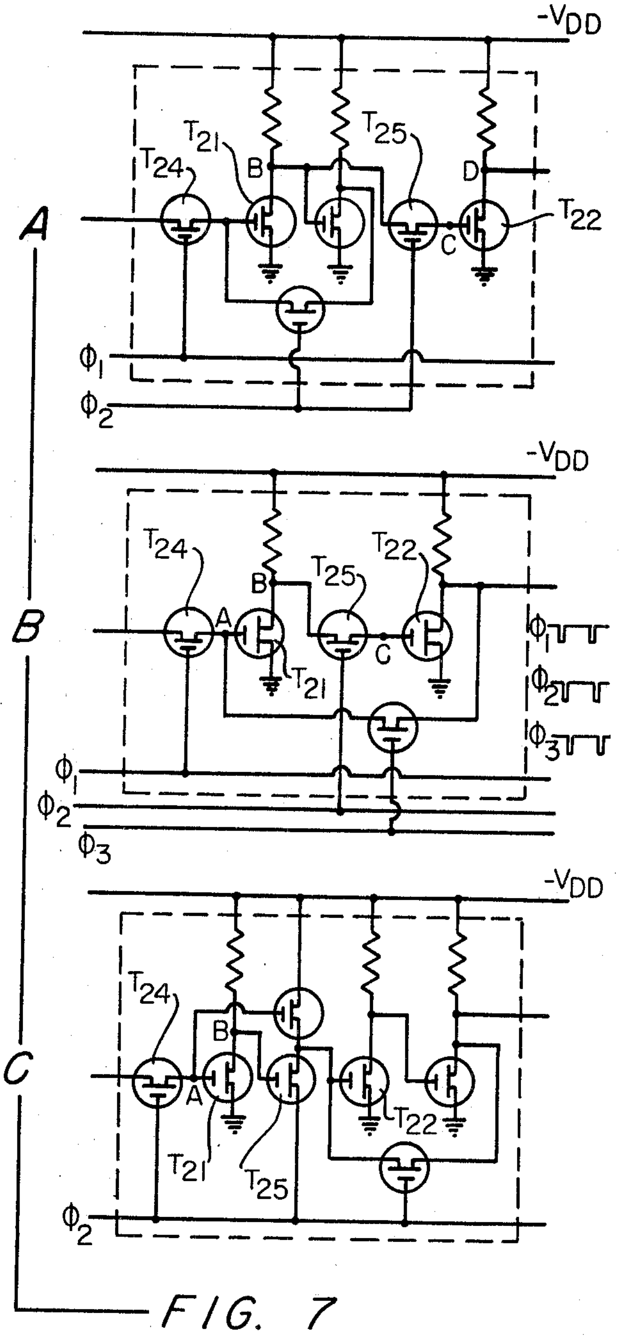
FIGS. 7, A, B and C illustrate examples of various memory elements (flip-flops) which may be employed in the various embodiments of the invention.

Description of the invention represented by the delay memory element of the counter has hereinbefore been made only by way of one example embodying the invention already illustrated. Nevertheless, there are other possible embodiments. Various schematic examples are shown in FIG. 7 where in the section of the circuit diagram common with the preceding illustrations of the circuit, the same symbol is used to denote the same element or part. The examples in FIG. 7 correspond, in the general principle of wiring connection and function, to all other examples illustrated in the preceding figures of circuit diagrams. Any section in FIG. 7 not similarly shown in the circuit diagrams in the previous figures is of no special significance in connection with the invention.

Although the description of the invention has been made with a certain degree of particularity, it is understood that the present disclosure has been made only by way of example and that numerous changes in the details of the embodiment may be resorted to without departing from the spirit and scope of the invention as hereinafter claimed.

We claim:

1. A counter comprising: a plurality of serially connected delay type memory elements each capable of temporarily storing input signals applied thereto for a predetermined time, each of said delay type memory elements including a field effect transistor with a gate internal capacitance for storing said input signals, means generating a train of clock pulses with a pulse repetition rate faster than said predetermined time, means for connecting said series connected delay type memory elements to said generating means to apply said train of clock pulses to each of said series connected memory elements to transfer an output of the first memory element of said series connected memory elements sequentially to the subsequent memory element in response to said train of clock pulses without losing stored signals, and logical gating means controlled only by the output of a plurality of said series connected memory elements for feeding back a repeat signal to the first memory element.

2. A counter as in claim 1 in which said logical gating means operates in accordance with the equation $$\overline{(X_1+X_2+\ \dots\ +X_n)}$$

in which X stands for the output state of the memory elements.

3. A counter as in claim 1 in which said logical gating means operates in accordance with the equation $$\overline{(X_1+X_2+\ \dots\ +X_n)}$$

in which X stands for the output state of the memory elements.

4. A counter as defined in claim 1 in which the output of said logical gating means is fed back to the first memory element through a circuit providing a "NOT" function.

5. A counter in accordance with claim 1 in which said input signals to said memory elements are in the form of pulses corresponding to the binary state "1" or "0" and in which the output of said delay memory elements correspond to said input binary state of "1" or "0" respectively and the counter operates with only one of the plurality of memory elements having the state of "1" while the remainder have the state corresponding to "0" after all the memory elements are first brought to the state of "1" as the initial state and in which said logical gating means comprises a logic circuit connected to receive the output state of the memory elements of the last two of the serially connected memory elements and operates in accordance with the equation $(X_{n-1}\cdot X_n)$ where $X_{n-1}$ and $X_n$ stand for the output of the last two delay memory elements.

6. A counter according to claim 5 in which said logic circuit comprises a plurality of uni-directional conductive elements having at least first and second terminals, one terminal of each of two being connected to the output of said last two memory elements, the other terminal of one of said uni-directional conductive elements and one terminal of an additional uni-directional conductive element being directly connected together and through the additional element to provide the "NOT" function, and a switch connected to the input side of the first memory element of the series of memory elements to render the output state of all the memory elements "1."

7. A counter according to claim 1 in which said input signals to said memory elements are in the form of pulses corresponding to the binary rate "1" or "0" and in which the output of said delay memory elements correspond to said input binary state of "1" or "0" respectively, and the counter operates in such a manner that only one of the plurality of memory elements has the output state of "0" while the remainder have the state of "1" after all the memory elements are first brought to the initial state of "0," and in which said logical gating means comprises a logic circuit connected to the output state of the memory element of the last two of the serially connected memory elements and operates in accordance with the equation $\overline{(X_{n-1}+X_n)}$ where $X_{n-1}$ and $X_n$ stand for the output of the last two delay memory elements.

8. A counter according to claim 7 in which said logic circuit comprises a plurality of uni-directional conductive elements having at least first and second terminals, one terminal of each of two thereof being connected to the output side of said last two memory elements and the other terminal of one of said uni-directional conductive elements and that of an additional uni-directional element being connected together and through said additional element to provide the "NOT" function, and a switch connected in the input side of the memory element of the first of the series connected elements for rendering the initial state of all of the memory elements "0."

References Cited

UNITED STATES PATENTS

| | | | |
|---|---|---|---|
| 3,079,513 | 2/1963 | Yokelson | 307—224 XR |
| 3,109,990 | 11/1963 | Shuba | 328—48 XR |
| 3,258,696 | 6/1966 | Heymann | 307—221 XR |
| 3,294,984 | 12/1966 | Wisecarver | 307—223 |
| 3,322,974 | 5/1967 | Ahrons et al. | 307—221 XR |
| 3,395,292 | 7/1968 | Bogert | 307—221 |

DONALD D. FORRER, Primary Examiner

J. ZAZWORSKY, Assistant Examiner

U.S. Cl. X.R.

307—279, 304